United States Patent
Chen et al.

(10) Patent No.: US 11,067,956 B2
(45) Date of Patent: Jul. 20, 2021

(54) VARIABLE REFRIGERANT FLOW SYSTEM WITH AUTOMATIC SENSOR DATA CORRECTION

(71) Applicant: Johnson Controls Technology Company, Auburn Hills, MI (US)

(72) Inventors: Ruoyu Chen, Milwaukee, WI (US); Liming Yang, Mequon, WI (US); Robert D. Turney, Watertown, WI (US)

(73) Assignee: Johnson Controls Technology Company, Auburn Hills, MI (US)

( * ) Notice: Subject to any disclaimer, the term of this patent is extended or adjusted under 35 U.S.C. 154(b) by 140 days.

(21) Appl. No.: 16/535,341

(22) Filed: Aug. 8, 2019

(65) Prior Publication Data
US 2021/0041839 A1 Feb. 11, 2021

(51) Int. Cl.
*G05B 13/04* (2006.01)
*F24F 11/00* (2018.01)
*F24F 11/62* (2018.01)
*F24F 11/61* (2018.01)
(Continued)

(52) U.S. Cl.
CPC ........... *G05B 13/048* (2013.01); *F24F 1/32* (2013.01); *F24F 3/001* (2013.01); *F24F 11/61* (2018.01); *F24F 11/62* (2018.01); *G05B 13/041* (2013.01); *G05B 2219/2614* (2013.01)

(58) Field of Classification Search
CPC . G05B 13/048; G05B 2219/2614; F24F 11/62
See application file for complete search history.

(56) References Cited

U.S. PATENT DOCUMENTS

| 2008/0028778 | A1  | 2/2008  | Millet |
| 2016/0313752 | A1* | 10/2016 | Przybylski ............. G05B 15/02 |
| 2017/0357225 | A1  | 12/2017 | Asp et al. |

(Continued)

FOREIGN PATENT DOCUMENTS

WO  WO-2017/184403 A1  10/2017

OTHER PUBLICATIONS

Li et al, Extending the virtual refrigerant charge sensor (VRC) for variable refrigerant flow (VRF) air conditioning system using data-based analysis methods, 2015, Applied Thermal Engineering, vol. 93, pp. 908-919 (Year: 2015).*

(Continued)

*Primary Examiner* — Mark A Connolly
(74) *Attorney, Agent, or Firm* — Foley & Lardner LLP

(57) ABSTRACT

A method for controlling a variable refrigerant flow (VRF) system includes applying a time window to sensor data associated with the VRF system, the sensor data including input data points and having a first resolution, wherein applying the time window to the sensor data isolates a subset of the input data points; applying a timing weight to one or more input data points in the subset of the input data points to generate corrected data points having a second resolution higher than the first resolution; creating a virtual sensor and mapping the corrected data points to an output of the virtual sensor; and controlling the VRF system based on an output of the virtual sensor. The use of virtual sensors with a higher resolution than corresponding physical sensors in this manner allows for existing physical sensors to be used while improving performance of the VRF system.

20 Claims, 7 Drawing Sheets

(51) Int. Cl.
　　　　*F24F 1/32*　　　　(2011.01)
　　　　*F24F 3/00*　　　　(2006.01)

(56) References Cited

U.S. PATENT DOCUMENTS

2018/0004173 A1　　1/2018　Patel et al.
2018/0283905 A1*　10/2018　Werth .................... G01D 5/145
2018/0373266 A1　12/2018　Sethu et al.
2019/0146430 A1　　5/2019　Chatterjee et al.

OTHER PUBLICATIONS

International Search Report and Written Opinion for PCT/US2020/045633, dated Oct. 21, 2020, 13 pages.

* cited by examiner

VARIABLE REFRIGERANT FLOW SYSTEM WITH AUTOMATIC SENSOR DATA CORRECTION

BACKGROUND

The present disclosure relates generally to heating, ventilation, and air conditioning (HVAC) systems, and more particularly to variable refrigerant flow (VRF) systems. VRF systems generally involve circulation of a refrigerant through a building. The refrigerant is conditioned by an outdoor unit and provided to indoor units installed in different locations within the building. In order to provide a desired amount of heating or cooling, VRF systems often rely on measurements from sensors installed throughout the building. These sensors, especially older sensors, can be imprecise and/or inaccurate. However, installing new sensors throughout an entire building can be costly. It is generally desirable to improve accuracy of VRF systems without requiring installation of new sensors.

SUMMARY

One implementation of the present disclosure is a method for controlling a VRF system. The method includes applying a time window to sensor data associated with the VRF system, the sensor data including input data points having a first resolution, wherein applying the time window to the sensor data isolates a subset of the input data points; applying a timing weight to one or more input data points in the subset of the input data points to generate corrected data points having a second resolution higher than the first resolution; creating a virtual sensor and mapping the corrected data points to an output of the virtual sensor; and controlling the VRF system based on an output of the virtual sensor.

In some embodiments, the subset of the input data points includes a set of most recent input data points.

In some embodiments, applying the timing weight to the one or more input data points in the subset of the input data points includes applying a different timing weight to each input data point in the subset of the input data points.

In some embodiments, the method further includes applying a highest timing weight to a most recent input data point in the subset of the input data points and applying successively lower timing weights to a remainder of input data points in the subset of the input data points.

In some embodiments, the timing weight is proportional to a number of input data points in the subset of the input data points.

In some embodiments, the method further includes receiving the sensor data from a return air temperature sensor of the VRF system.

In some embodiments, controlling the VRF system based on the output of the virtual sensor includes applying the output of the virtual sensor as input to a control algorithm, determining a temperature setpoint using the control algorithm, and controlling the VRF system using the temperature setpoint.

Another implementation of the present disclosure is a controller for use with a VRF system. The controller includes one or more processors and a memory. The memory includes a control application that, when executed by the one or more processors, causes the controller to implement operations including applying a time window to sensor data associated with the VRF system, the sensor data including input data points having a first resolution, wherein applying the time window to the sensor data isolates a subset of the input data points; applying a timing weight to one or more input data points in the subset of the input data points to generate corrected data points having a second resolution higher than the first resolution; creating a virtual sensor and mapping the corrected data points to an output of the virtual sensor; and controlling the VRF system based on an output of the virtual sensor.

In some embodiments, the subset of the input data points includes a set of most recent input data points.

In some embodiments, applying the timing weight to the one or more input data points in the subset of the input data points includes applying a different timing weight to each input data point in the subset of the input data points.

In some embodiments, the operations further include applying a highest timing weight to a most recent input data point in the subset of the input data points and applying successively lower timing weights to a remainder of input data points in the subset of the input data points.

In some embodiments, the timing weight is proportional to a number of input data points in the subset of the input data points.

In some embodiments, the operations further include receiving the sensor data from a return air temperature sensor of the VRF system.

In some embodiments, controlling the VRF system based on the output of the virtual sensor includes applying the output of the virtual sensor as input to a control algorithm, determining a temperature setpoint using the control algorithm, and controlling the VRF system using the temperature setpoint.

Yet another implementation of the present disclosure is a VRF system. The system includes an outdoor unit that conditions a refrigerant and one or more indoor units that receive the refrigerant and provide heating or cooling within a building. The system further includes a controller that includes one or more processors and a memory. The memory includes a control application that, when executed by the one or more processors, causes the controller to implement operations including applying a time window to sensor data associated with the VRF system, the sensor data including input data points having a first resolution, wherein applying the time window to the sensor data isolates a subset of the input data points; applying a timing weight to one or more input data points in the subset of the input data points to generate corrected data points having a second resolution higher than the first resolution; creating a virtual sensor and mapping the corrected data points to an output of the virtual sensor; and controlling the VRF system based on an output of the virtual sensor.

In some embodiments, the subset of the input data points includes a set of most recent input data points.

In some embodiments, applying the timing weight to the one or more input data points in the subset of the input data points includes applying a different timing weight to each input data point in the subset of the input data points.

In some embodiments, the operations further include applying a highest timing weight to a most recent input data point in the subset of the input data points and applying successively lower timing weights to a remainder of input data points in the subset of the input data points.

In some embodiments, the timing weight is proportional to a number of input data points in the subset of the input data points.

In some embodiments, controlling the VRF system based on the output of the virtual sensor includes applying the output of the virtual sensor as input to a control algorithm, determining a temperature setpoint using the control algorithm, and controlling the VRF system using the temperature setpoint.

Those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

DETAILED DESCRIPTION

Overview

Referring generally to the FIGURES, systems and methods for sensor data correction in a VRF system are shown, according to various embodiments. A controller of the VRF system is configured to pre-process sensor data in order to provide more accurate input data to a control application executed by the controller. The sensor data can include temperature data indicative of temperature within a building in which the VRF system is installed. The pre-processing of sensor data performed by the controller generally involves applying a time window to isolate a subset of data points and applying timing weights to each of the data points in the subset of data points. The controller then maps corrected data points to an output of a virtual sensor that has a higher resolution than the corresponding physical sensor. The systems and methods described herein may allow for improved accuracy of the VRF system as a whole without requiring installation of new sensors, thereby delivering improved comfort for building occupants, reduced energy usage, and cost savings.

VRF System

Figure 1A:
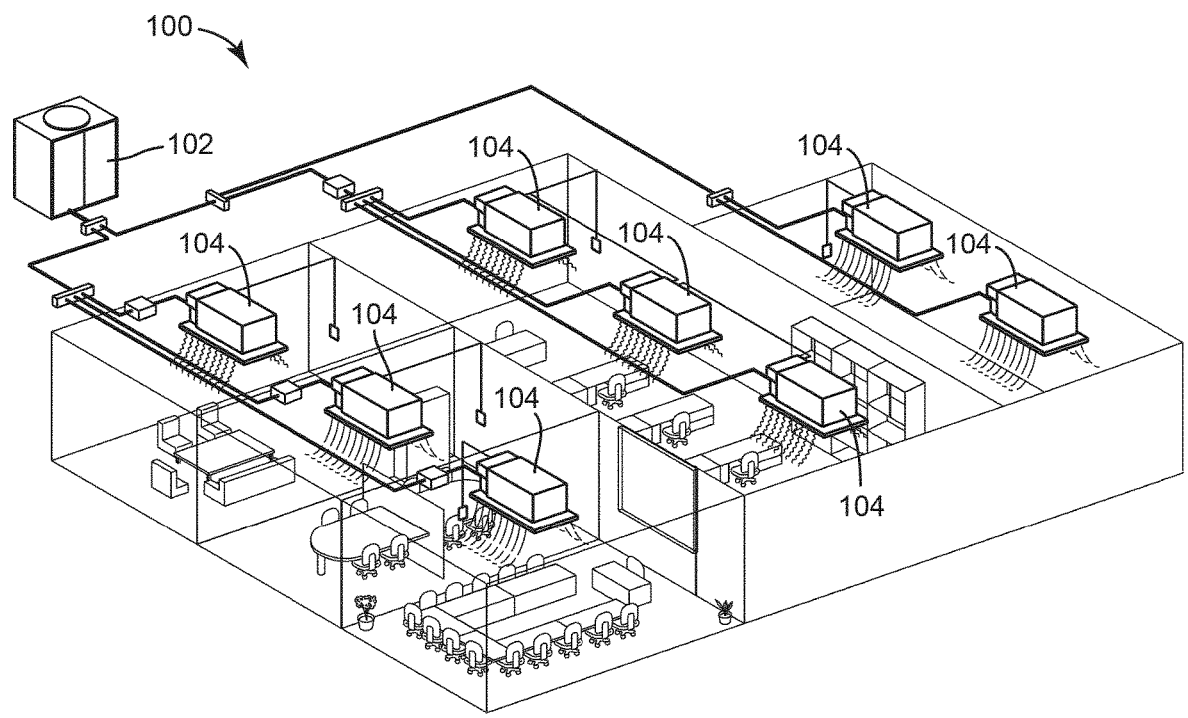
FIGS. 1A-1B are drawings of a variable refrigerant flow (VRF) system having one or more outdoor VRF units and a plurality of indoor VRF units, according to some embodiments.
Figure 1B:
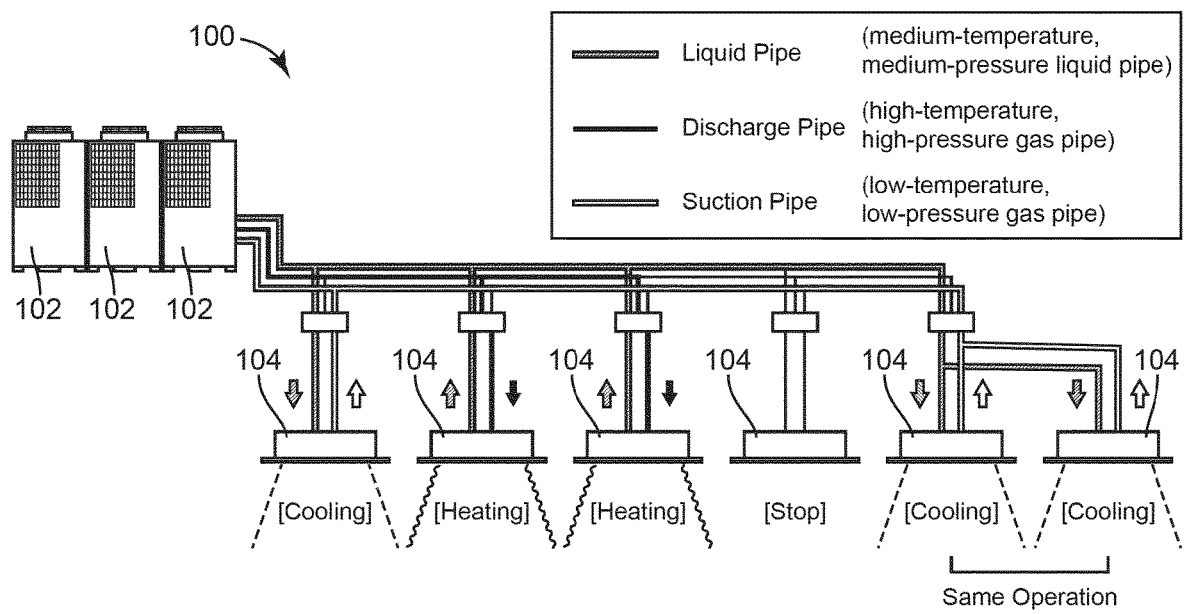

Referring now to FIGS. 1A-1B, a variable refrigerant flow (VRF) system 100 is shown, according to some embodiments. VRF system 100 is shown to include a plurality of outdoor VRF units 102 and a plurality of indoor VRF units 104. Outdoor VRF units 102 can be located outside a building and can operate to heat or cool a refrigerant. Outdoor VRF units 102 can consume electricity to convert refrigerant between liquid, gas, and/or super-heated gas phases. Indoor VRF units 104 can be distributed throughout various building zones within a building and can receive the heated or cooled refrigerant from outdoor VRF units 102. Each indoor VRF unit 104 can provide temperature control for the particular building zone in which the indoor VRF unit is located.

A primary advantage of VRF systems is that some indoor VRF units 104 can operate in a cooling mode while other indoor VRF units 104 operate in a heating mode. For example, each of outdoor VRF units 102 and indoor VRF units 104 can operate in a heating mode, a cooling mode, or an off mode. Each building zone can be controlled independently and can have different temperature setpoints. In some embodiments, each building has up to three outdoor VRF units 102 located outside the building (e.g., on a rooftop) and up to 128 indoor VRF units 104 distributed throughout the building (e.g., in various building zones).

Many different configurations exist for VRF system 100. In some embodiments, VRF system 100 is a two-pipe system in which each outdoor VRF unit 102 connects to a single refrigerant return line and a single refrigerant outlet line. In a two-pipe system, all of the outdoor VRF units 102 operate in the same mode since only one of a heated or chilled refrigerant can be provided via the single refrigerant outlet line. In other embodiments, VRF system 100 is a three-pipe system in which each outdoor VRF unit 102 connects to a refrigerant return line, a hot refrigerant outlet line, and a cold refrigerant outlet line. In a three-pipe system, both heating and cooling can be provided simultaneously via the dual refrigerant outlet lines. An example of a three-pipe VRF system which can be used for VRF system 100 is described in detail below.

Figure 2A:
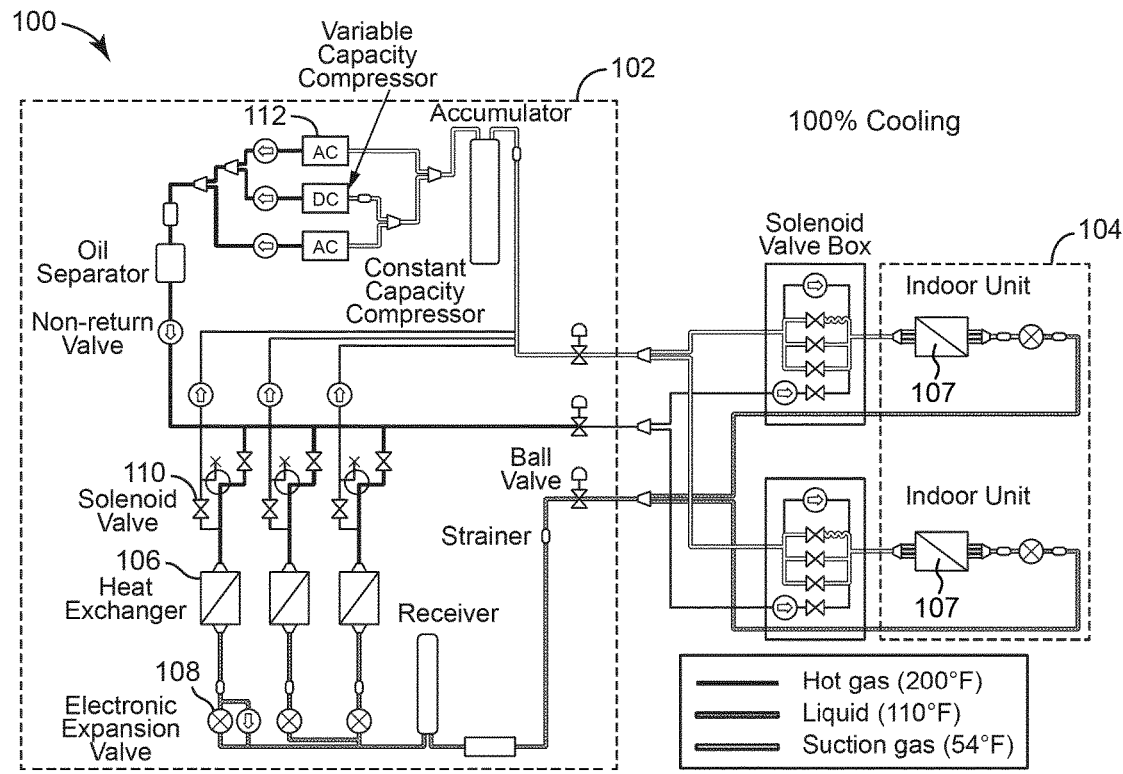
FIG. 2A is a diagram illustrating the operation of the VRF system of FIGS. 1A-1B in a cooling mode, according to some embodiments.
Figure 2B:
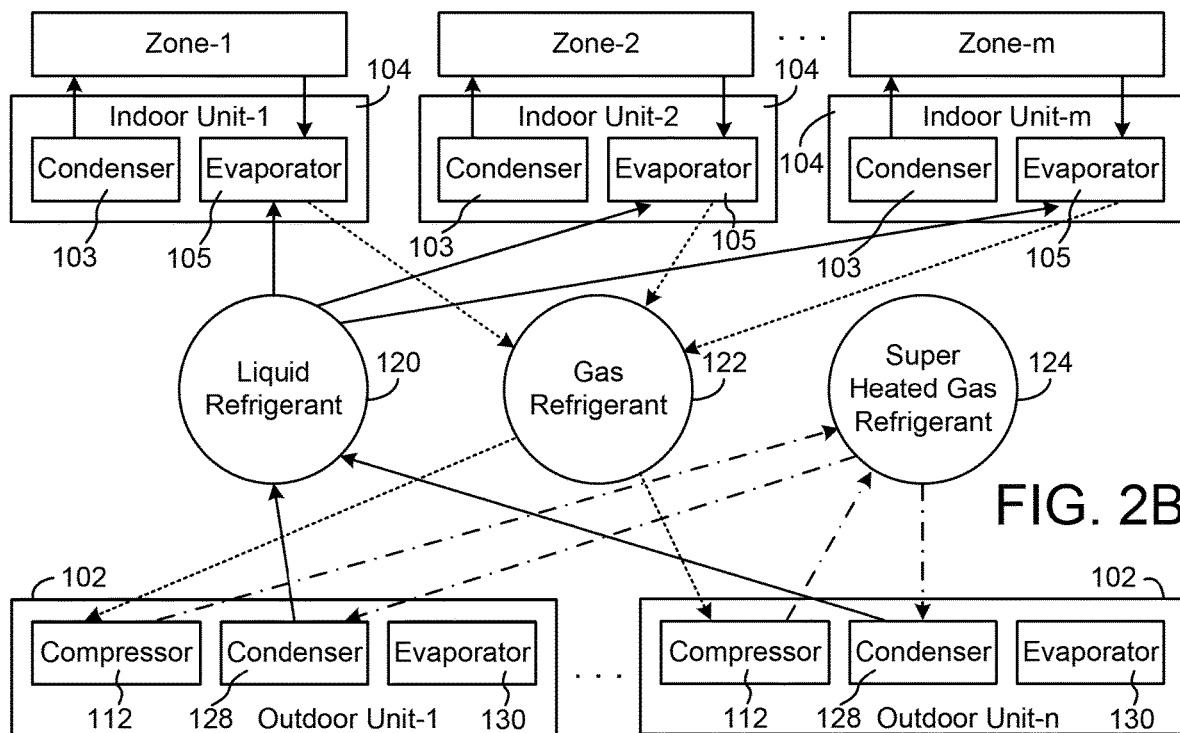
FIG. 2B is a directed graph illustrating the balance of refrigerant states when the VRF system operates in the cooling mode, according to some embodiments.
Figure 3A:
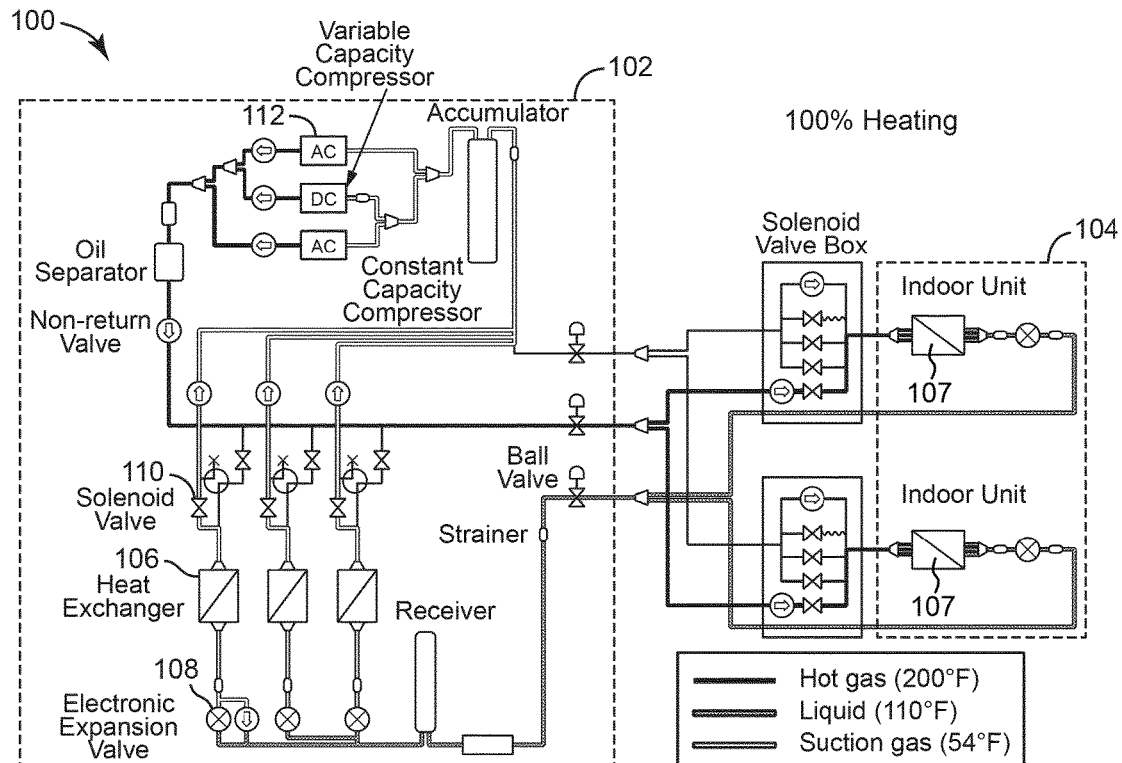
FIG. 3A is a diagram illustrating the operation of the VRF system of FIGS. 1A-1B in a heating mode, according to some embodiments.
Figure 3B:
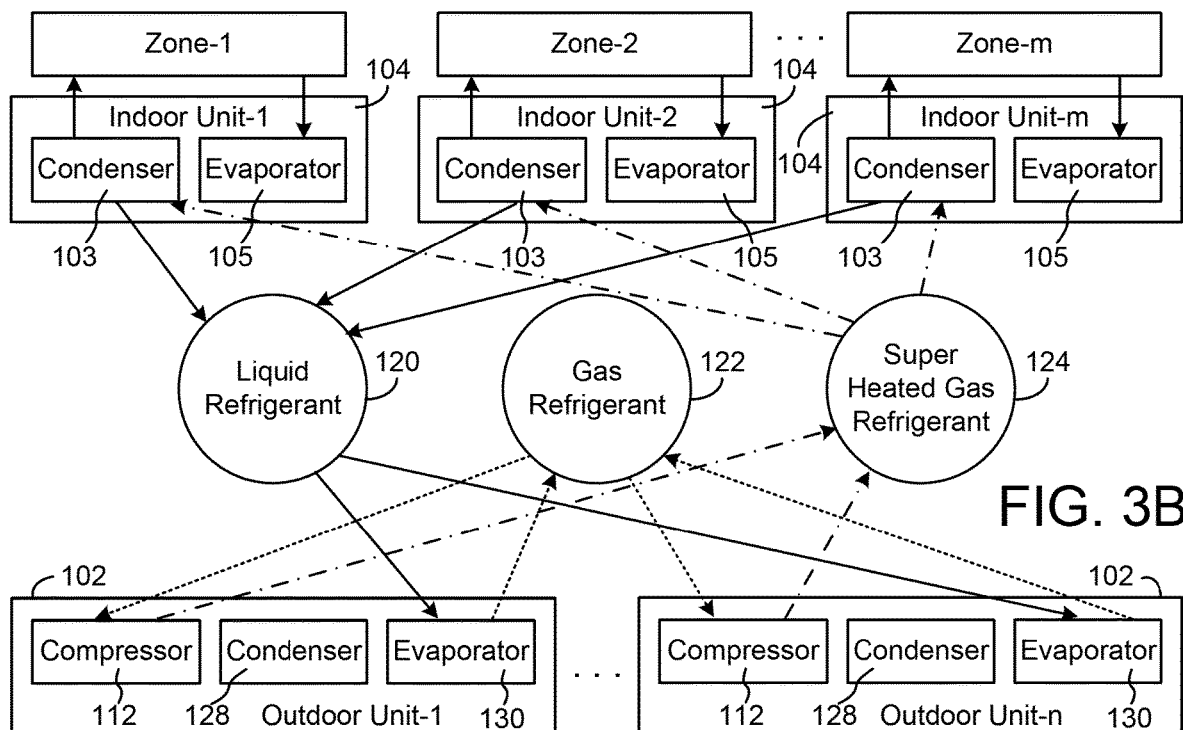
FIG. 3B is a directed graph illustrating the balance of refrigerant states when the VRF system operates in the heating mode, according to some embodiments.
Figure 4A:
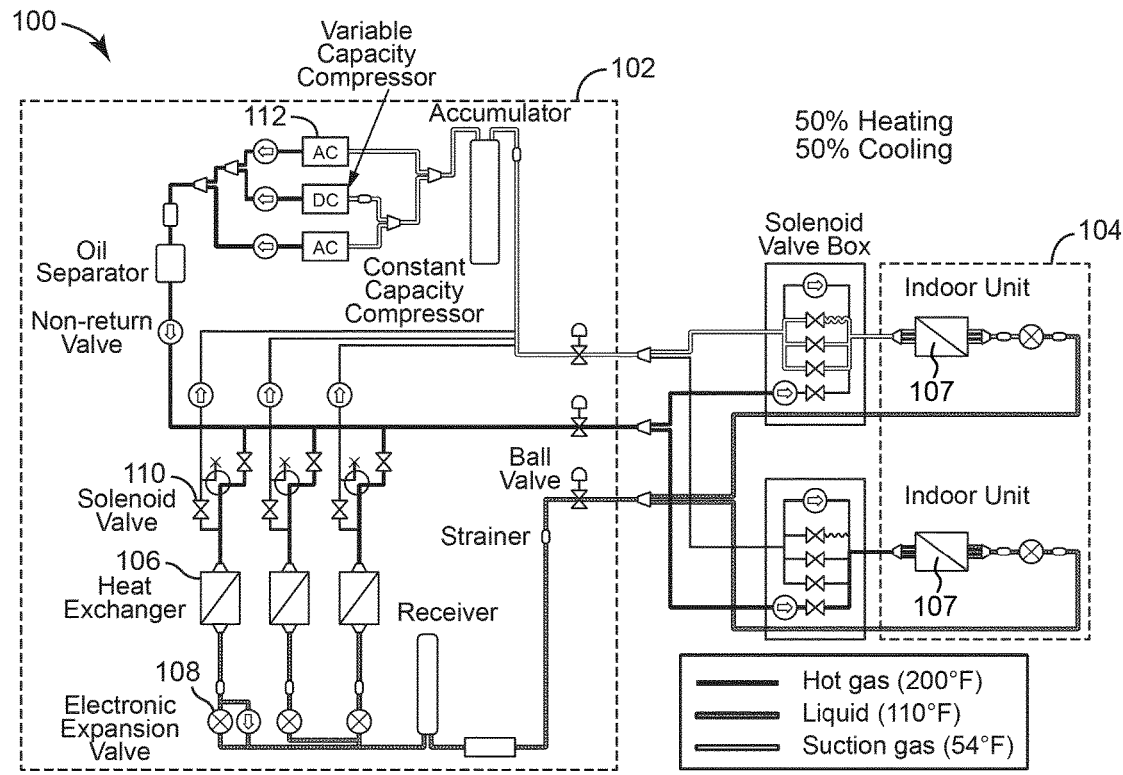
FIG. 4A is a diagram illustrating the operation of the VRF system of FIGS. 1A-1B in a combined heating and cooling mode, according to some embodiments.
Figure 4B:
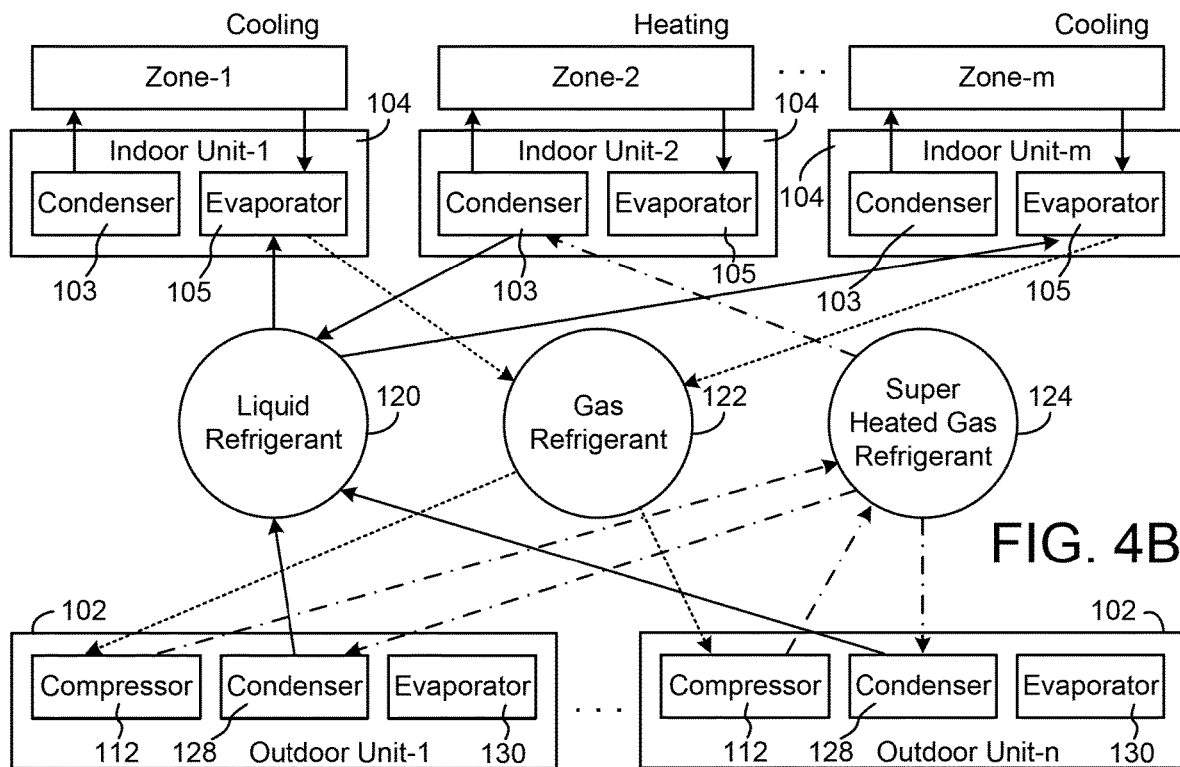
FIG. 4B is a directed graph illustrating the balance of refrigerant states when the VRF system operates in the combined heating and cooling mode, according to some embodiments.

Referring now to FIGS. 2A-4B, several diagrams illustrating the operation of VRF system 100 in a cooling mode, a heating mode, and a combined heating/cooling mode are shown, according to some embodiments. Each outdoor VRF unit 102 may include one or more heat exchangers 106 (as shown in FIGS. 2A, 3A, and 4A). When outdoor VRF units 102 operate in a cooling mode, heat exchangers 106 can operate as condensers 128 (as shown in FIGS. 2B and 4B) to provide cooling for the refrigerant. When outdoor VRF units 102 operate in a heating mode, heat exchangers 106 can be operated as evaporators 130 (as shown in FIG. 3B) to provide heating for the refrigerant. It is contemplated that condensers 128 and evaporators 130 may exist as separate devices within outdoor VRF units 102 or may exist as heat exchangers 106 which can be operated as both condensers 128 and evaporators 130 depending on the mode of operation of outdoor VRF units 102. Although only two outdoor VRF units 102 are shown, it should be understood that VRF system 100 can include any number n of outdoor VRF units 102.

Each indoor VRF unit 104 may include one or more heat exchangers 107 (as shown in FIGS. 2A, 3A, and 4A) When indoor VRF units 104 operate in a cooling mode, heat exchangers 107 can operate as evaporators 105 (as shown in FIGS. 2B and 4B) to provide cooling for the air delivered to the building zones. When indoor VRF units 104 operate in a heating mode, heat exchangers 107 can be operated as condensers 103 (as shown in FIG. 3B) to provide heating for the air delivered to the building zones. It is contemplated that condensers 103 and evaporators 105 may exist as separate devices within indoor VRF units 104 or may exist as heat exchangers 107 which can be operated as both condensers 103 and evaporators 105 depending on the mode of operation of indoor VRF units 104. Although only three indoor VRF units 104 are shown, it should be understood that VRF system 100 can include any number m of indoor VRF units 104.

Referring particularly to FIGS. 2A-2B, the operation of VRF system 100 in the cooling mode is shown, according to some embodiments. In the cooling mode, heat exchangers 106 of outdoor VRF units 102 operate as condensers 128 to condense a superheated gas refrigerant 124 into a liquid refrigerant 120. The liquid refrigerant 120 from heat exchangers 106 flows through the expansion valves (EEV) 108 and on to heat exchangers 107 of indoor VRF units 104. In the cooling mode, heat exchangers 107 operate as evaporators 105 to evaporate the liquid refrigerant 120 to a gas refrigerant 122, thereby absorbing heat from the air within the building zones and providing cooling for the building zones. Solenoid valves 110 allow for the gas refrigerant 122 to return to one or more compressors 112 of outdoor units 102. Compressors 112 compress the gas refrigerant 122 to create a superheated gas refrigerant 124, which is provided to condensers 128.

Referring now to FIGS. 3A-3B, the operation of VRF system 100 in the heating mode is shown, according to some embodiments. In the heating mode, heat exchangers 106 of outdoor VRF units 102 operate as evaporators 130 to evaporate the liquid refrigerant 120 from the indoor VRF units 104. Heat exchangers 106 transfer heat into the liquid refrigerant 120, thereby causing the liquid refrigerant 120 to evaporate and form a gas refrigerant 122. The gas refrigerant 122 is provided to compressors 112, which compress the gas refrigerant 122 to form a superheated gas refrigerant 124. The superheated gas refrigerant 124 is then provided to heat exchangers 107 of indoor VRF units 104. Heat exchangers 107 operate as condensers 102 to condense the superheated gas refrigerant 124 by transferring heat from the superheated gas refrigerant 124 to the building zones, thereby causing the superheated gas refrigerant 124 to lose heat and become the liquid refrigerant 120. The liquid refrigerant 120 is then returned to heat exchangers 106 outdoor VRF units 102.

Referring now to FIGS. 4A-4B, the operation of VRF system 100 in a combined heating and cooling mode is shown, according to some embodiments. In the combined heating/cooling model, some indoor and outdoor VRF units 102-104 operate in a heating mode while other indoor and outdoor VRF units 102-104 operate in a cooling mode. For example, indoor VRF unit-2 is shown operating in a heating mode, whereas indoor VRF unit-1 and indoor VRF unit-m are shown operating in the cooling mode. Both outdoor VRF unit-1 and outdoor VRF unit-n are shown operating in the cooling mode.

The operation of outdoor VRF units 102 in the cooling mode can be the same as previously described with reference to FIGS. 2A-2B. For example, outdoor VRF units 102 can receive the gas refrigerant 122 and condense the gas refrigerant 122 into a liquid refrigerant 120. The liquid refrigerant 120 can be routed to indoor VRF unit-1 and indoor VRF unit-m to provide cooling for zone-1 and zone-m. Heat exchangers 107 of indoor VRF unit-1 and indoor VRF unit-m operate as evaporators 105, by absorbing heat from building zone-1 and building zone-m, thereby causing the liquid refrigerant 120 to become a gas refrigerant 122. The gas refrigerant 122 is then delivered to compressors 112 of outdoor VRF units 1022. Compressors 112 compress the gas refrigerant 122 to form a superheated gas refrigerant 124. The superheated gas refrigerant 124 can be provided to heat exchangers 106 of outdoor VRF units 102, which operate as condensers 128 to condense the gas refrigerant 122 to liquid refrigerant 120. The superheated gas refrigerant 124 can also be provided to indoor VRF unit-2 and used to provide heating to building zone-2.

The operation of indoor VRF unit-2 in the heating mode can be the same as previously described with reference to FIGS. 3A-3B. For example, heat exchanger 107 of indoor VRF unit-2 can operate as a condenser 103 by rejecting heat from the superheated gas refrigerant 124 to building zone-2, thereby causing the superheated gas refrigerant 124 to become a liquid refrigerant 120. The liquid refrigerant 120 can be routed to heat exchangers 107 of indoor VRF unit-1 and indoor VRF unit-m, which operate as evaporators 105 to absorb heat from building zone-1 and building zone-m, as previously described.

Controller

Figure 5:
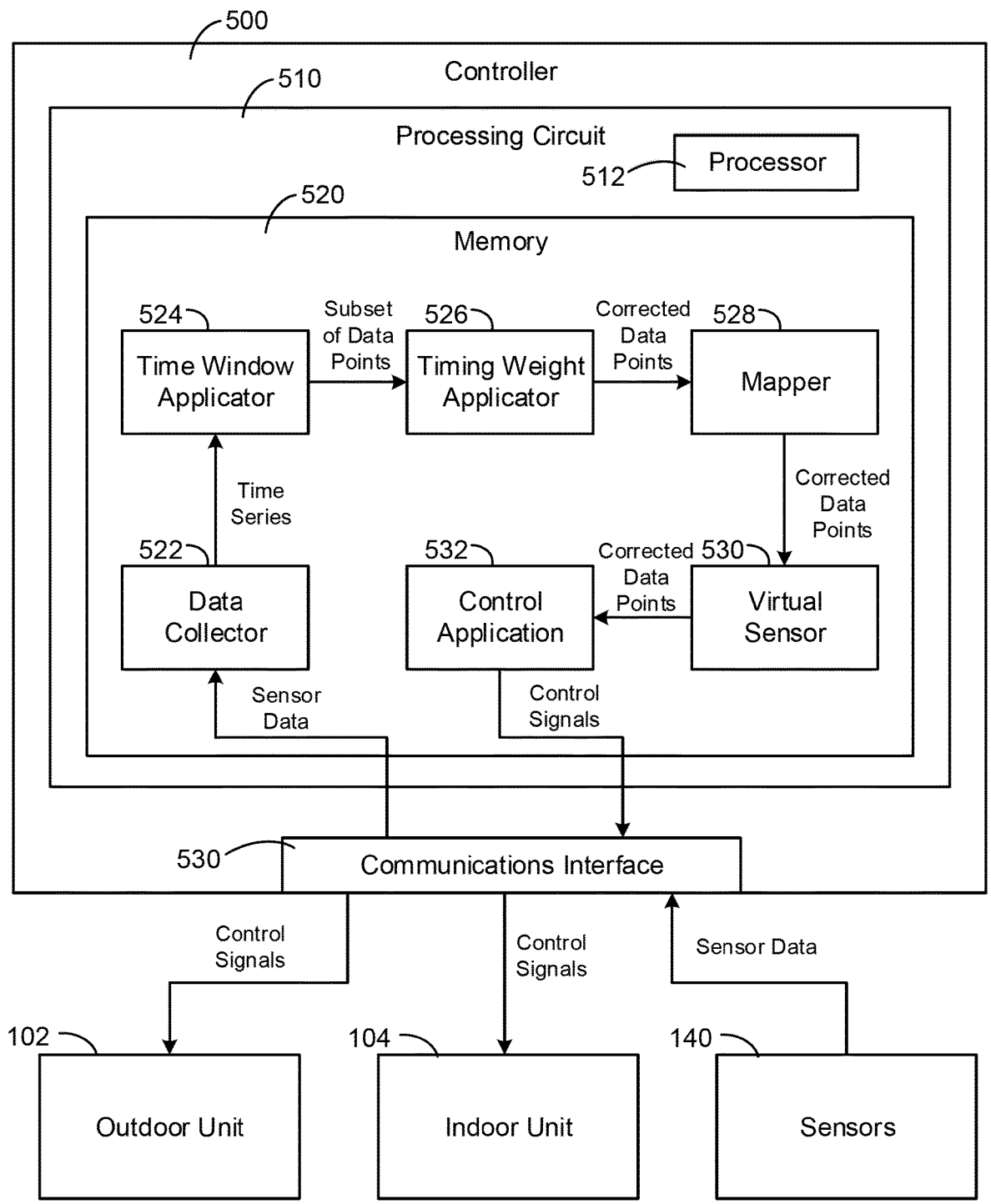
FIG. 5 is a block diagram of controller for use with the VRF system of FIGS. 1A-1B, according to some embodiments.

Referring now to FIG. 5, a block diagram of a controller 500 for use with VRF system 100 is shown, according to some embodiments. Controller 500 may be a zone controller for use with one or more indoor units 104 and/or one or more outdoor units 102. Controller 500 may also be a higher-level system controller responsible for controlling most or all components of VRF system 100. Controller 500 can be configured to pre-process sensor data and create virtual sensors in order to make more accurate control decisions and generally improve performance of VRF system 100 without requiring installation of new physical sensors. The pre-processing of sensor data as performed by controller 500 may facilitate energy savings, cost savings, and improved comfort for building occupants.

Controller 500 is shown to include a processing circuit 510 that includes a processor 512 and a memory 520. Controller 500 is also shown to include a communication interface 530 that facilitates communication with various devices such as outdoor units 102, indoor units 104, sensors 140, and other devices. Processor 512 may be implemented using a variety of different types of processors and processing devices. Similarly, memory 520 may be implemented using a variety of different types of memory and memory devices. Communications interface 530 may provide wireless and/or wireless communications capabilities such as serial communications, Ethernet communications, Wi-Fi communications, and other types of communications. Sensors 140 may include a variety of different sensors such as temperature sensors, pressure sensors, flow sensors, position sensors, humidity sensors, and air quality sensors. For example, sensors 140 may include return air temperature sensors associated with VRF system 100. Sensors 140 may also include sensors that are part of controller 500 itself, such as one or more built-in temperature sensors.

Memory 520 is shown to include a data collector 522 the can be configured to receive data from sensors 140 and store the data within memory 520. Data collector 522 may format received data for appropriate processing. For example, data collector 522 may be configured to convert raw data received from sensors 140 between various communications protocols (e.g., BACnet, LON, N2, Modbus, H-Link, etc.). Data collector 522 may also be configured to generate time series data based on the raw data received from sensors 140. For example, data collector 522 may generate a time series representing temperature data received from a return air temperature sensor that is associated with one or more indoor units 104. The time series may include temperature data points indexed in time order and spaced apart by a certain period of time (e.g., 1 second, 15 seconds, 30 seconds, 5 minutes, 30 minutes). Data collector 522 can be configured to apply metadata such as time stamps and identifiers to the raw data received from sensors 140. It will be appreciated that data collector 522 may also receive data from other devices within VRF system 100 such as other controllers and network devices. Data collector 522 may allow controller 500 to receive and store data in a consistent and meaningful manner to improve processing efficiency and effectiveness.

Memory 520 is also shown to include a time window applicator 524 that can be configured to apply a time window to data received from sensors 140. For example, time window applicator 524 may receive a time series of temperature data points from data collector 522 and apply a time window to the time series to isolate a subset of temperature data points. Time window applicator 524 may apply a time window to isolate a set of most recent data points in the time series, such as the twenty most recent data points. As new temperature data points are received, the oldest temperature data points in the time window can be replaced with the new temperature data points.

Memory 520 is also shown to include a timing weight applicator 526 that can be configured to apply timing weights to data points within a time window applied by time window applicator 524. For example, timing weight applicator 526 may apply weights in accordance with the example equation:

$$\begin{vmatrix} Weight_1 \\ Weight_2 \\ Weight_3 \\ \vdots \\ Weight_n \end{vmatrix} = \begin{vmatrix} 1 \\ 2 \\ 3 \\ \vdots \\ n \end{vmatrix} * \frac{1}{1+2+3+\ldots+n} \qquad (1)$$

In equation (1), the variable n represents a number of data points within a time window applied by time window applicator 524. For example, if time window applicator 524 applies a time window to isolate a subset of 15 data points, then n=15. The left-hand side of equation (1) is a vector representing a series of weights that can be applied by timing weight applicator 526. For example, the term $Weight_1$ represents a timing weight that is applied to the oldest data point within the time window, such as the data point with the oldest time stamp. Using equation (1), $Weight_1$ is calculated by multiplying the coefficient 1 by the fraction $$\frac{1}{1+2+3+\ldots+n}.$$

Using the example where n=15, $Weight_1$ is then approximately equal to 0.0083. Similarly, $Weight_n$ represents a timing weight that is applied to the most recent data point within the time window. Continuing with the example where n=15, $Weight_n$ is calculated by multiplying the coefficient 15 by the fraction $$\frac{1}{1+2+3+\ldots+15}$$

such that $weight_n$ is approximately equal to 0.1250.

Timing weight applicator 526 may apply different timing weights to each of the data points within a time window in this manner such that a highest timing weight is applied to a most recent data point, and successively lower timing weights are applied to the remaining data points. Using the above equation, the timing weight applied to each data point within a time window is proportional to the number of data points in the time window. After applying the timing weights in this manner, timing weight applicator 526 may generate a corrected data point corresponding to the most recent data point by calculating a sum of the time-weighted data in accordance with the following example equation:

$$\text{Corrected Data Point} = \Sigma_{i=1}^{n} Weight_i * \text{Data Point}_i \qquad (2)$$

In equation (2), the variable i represents an index that is incremented from 1 until n, the number of data points within the time window. The term $Weight_i$ corresponds to a timing weight, such as the timing weights in the vector of equation (1). The term $Data Point_i$ corresponds to an input data point within a subset of input data points as isolated by time window applicator 524. For example, equation (2) can be written in the form Corrected Data Point=$Weight_1$*Data $Point_1$+$Weight_2$*Data $Point_2$+ . . . +$Weight_n$*Data $Point_n$. Timing weight applicator 526 may repeat this process for new data points received by controller 500 to generate corrected data points for each data point in a time series. This pre-processing of sensor data allows controller 500 to make more accurate control decisions for VRF system 100.

Memory 520 is also shown to include a mapper 528 that can be configured to map corrected sensor data points to an output of a virtual sensor 530. Virtual sensor 530 generally has a higher resolution than the corresponding physical sensor that the raw data points originate from. For example, a physical temperature sensor associated with VRF system 100 may have a resolution of 1° C., meaning the smallest change that the physical temperature sensor can detect is only 1° C. However, virtual sensor 530 may have a resolution of 0.1° C., meaning virtual sensor 530 can detect changes of 0.1° C. As such, by using virtual sensor 530, controller 500 can make more accurate control decisions for VRF system 100 without requiring installation of new sensors throughout a building, which can be expensive. Mapper 528 can use various criteria such as device identifiers, time series identifiers, and other information to map corrected data points to the output of virtual sensor 530. Controller 500 may generate new virtual sensors if a virtual sensor does not already exist in memory 520 for a corresponding physical sensor. For example, mapper 528 may maintain a table or other type of mapping that includes identifiers for physical sensors and corresponding identifiers for virtual sensors.

Memory 520 is also shown to include a control application 532 that can be configured to generate control signals to control equipment associated with VRF system 100 based at least in part on inputs received from virtual sensor 530. From the perspective of control application 532, the output of virtual sensor 530 looks like an output of a physical sensor. However, virtual sensor 530 may have a second resolution that is higher than a first resolution associated with a corresponding physical sensor, and therefore control application 532 can receive more accurate input data. Control application 532 can be created using a programming language such as MATLAB and/or other similar programming languages (e.g., C, Python, Java, etc.). Control application 532 can also be created using ladder logic, directed graphs, function blocks, and other similar approaches. For example, control application 532 may be configured to determine a temperature setpoint and/or make control decisions to achieve a temperature setpoint. The ability of control application 532 to make such control decisions using more accurate sensor data allows for improved efficiency and performance of VRF system 100 as a whole. The control signals determined by control application 532 may affect operation of one or more of condensers 103, evaporators 105, heat exchangers 106, heat exchangers 107, expansion valves 108, solenoid valves 110, compressors 112, condensers 128, and evaporators 130 as described above, for example. Control application 532 may be configured to execute a variety of different types of control algorithms including, but not limited to, state-based algorithms, extremum-seeking control (ESC) algorithms, proportional-integral (PI) algorithms, proportional-integral-derivative (PID) algorithms, model predictive control (MPC) algorithms, feedback control algorithms, feedforward control algorithms, and various combinations thereof.

Figure 6:
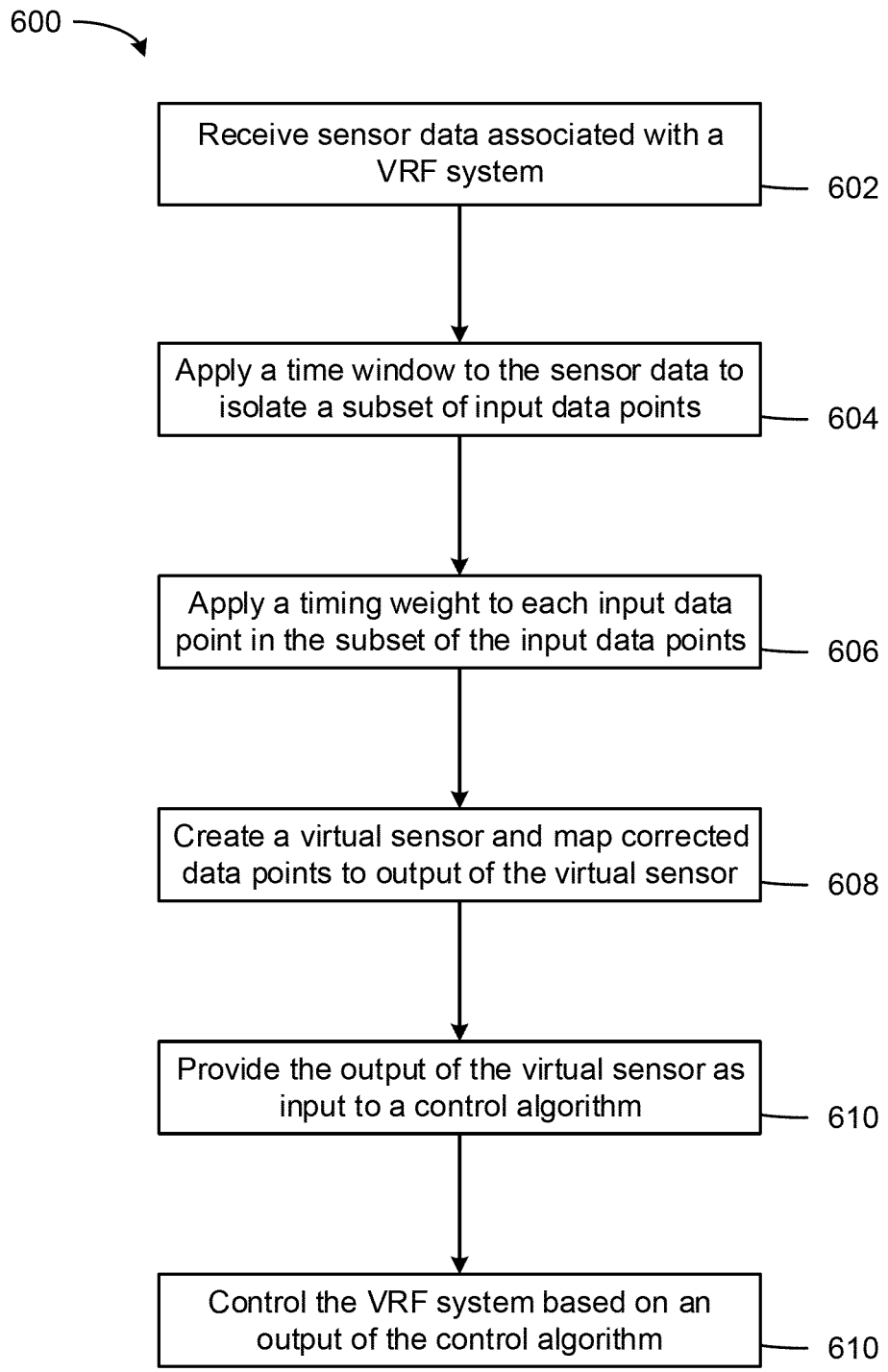
FIG. 6 is flow diagram of a process for controlling the VRF system of FIGS. 1A-1B that can be performed by the controller of FIG. 5, according to some embodiments.

Referring now to FIG. 6, a flow diagram of a process 600 for controlling VRF system 100 is shown, according to some embodiments. Process 600 can be performed by controller 500 as described above and generally involves pre-processing of sensor data and creation of one or more virtual sensors before providing input data to a control application. In some existing VRF systems, outputs from existing physical sensors may be inaccurate and/or imprecise due to limitations of the existing physical sensors. Process 600 may result in execution of more accurate control decisions for VRF system 100 without requiring installation of new physical sensors, thereby saving cost. As result of the improved accuracy, process 600 may facilitate energy savings and improved comfort for building occupants. It will be appreciated that process 600 can be applied to a variety of different types of HVAC systems in addition to VRF systems.

Process 600 can be performed by a single controller device or can be performed by multiple controller devices operating together as a controller for VRF system 100. For example, a remote controller may perform one or more steps of process 600 and a zone controller may perform the remaining steps of process 600. The remote controller may be a wireless handheld device used to control VRF system 100, for example. One or more steps of process 600 may also be performed by one or more on-premises or remote (e.g., cloud) computing servers. It will be appreciated that process 600 can be implemented using a variety of different types and combinations of hardware components used to control VRF system 100.

Process 600 is shown to include receiving sensor data associated with a VRF system (step 602). For example, controller 500 may receive sensor data from sensors 140 through communications interface 530. Controller 500 may also receive sensor data from one or more sensors built-in to controller 500. The sensor data generally includes input data points representing sensor readings at different times. The sensor data may be temperature data that is generally indicative of temperature within a building. For example, the temperature data may indicate temperature of a plurality of spaces within the building. Each space may be associated with a particular one of indoor units 104. As discussed above, the data received in step 602 may be inaccurate and/or imprecise. Controller 500 can be configured to format the data received in step 602 for appropriate processing, such as by generating a time series, applying metadata, and converting between different protocols. The sensor data received in step 602 may also include pressure data, flow data, position data, energy consumption data, and other types of sensor data associated with VRF system 100.

Process 600 is also shown to include applying a time window to the sensor data to isolate a subset of input data points (step 604). For example, step 604 may be performed by time window applicator 524 as described above. Controller 500 may apply a time window of 15 seconds to sensor data to isolate a subset of data points. The subset of data points may include the most recent data points received by controller 500. As new data points are received, the oldest data points in time window can be replaced with the new data points. The ability to isolate a subset of most recent data points in this manner allows controller 500 to understand how the sensor data received in step 602 changes over time.

Process 600 is also shown to include applying a timing weight to each of the data points in the subset of data points (step 606). For example, step 606 may be performed by timing weight applicator 526 as described above. Step 606 may involve applying different timing weights to each of the data points within the time window applied in step 604 such that a highest timing weight is applied to a most recent data point within the time window, and successively lower timing weights are applied to the remainder of data points within the time window. Other methods for evaluating the data points in the subset of data points in step 606 are also contemplated. For example, step 606 may include calculating a simple moving average or a cumulative moving average, among other approaches. Step 606 generally involves evaluating the data points in the subset of data points in order produce more accurate sensor data for input to one or more control algorithms.

Process 600 is also shown to include creating a virtual sensor and mapping corrected data points to an output of the virtual sensor (step 608) as well as providing the output of the virtual sensor as input to a control algorithm (step 610). For example, mapper 528 can map the time-weighted data from step 606 to an output of virtual sensor 530, and the output of virtual sensor 530 may be applied as input to one or more control algorithms associated with control application 532 as described above. The virtual sensor generally has a higher resolution than the associated physical sensor. The control algorithm can be configured to determine a temperature setpoint, a pressure setpoint, a position setpoint, a flow setpoint, a status (on/off), and/or other types of outputs using the higher resolution virtual sensor output. Since the virtual sensor output is more accurate than the physical sensor, the control algorithm can generate more accurate outputs, and therefore VRF system 100 can be operated more efficiently. Control algorithms used in step 608 may include state-based algorithms, extremum-seeking control (ESC) algorithms, proportional-integral (PI) algorithms, proportional-integral-derivative (PID) algorithms, model predictive control (MPC) algorithms, feedback control algorithms, feedforward control algorithms, and various combinations thereof.

Process 600 is also shown to include controlling the VRF system based on an output of the control algorithm (step 612). For example, controller 500 may execute control application 532 to determine appropriate control signals to provide to outdoor units 102 and/or indoor units 104 to affect operation of outdoor units 102 and/or indoor units 104 to achieve a desired temperature setpoint or other type of setpoint. The control signals may affect operation of one or more of condensers 103, evaporators 105, heat exchangers 106, heat exchangers 107, expansion valves 108, solenoid valves 110, compressors 112, condensers 128, and evaporators 130 as described above. The control signals determined by controller 500 may generally control and optimize the flow of refrigerant within VRF system 100.

Figure 7:
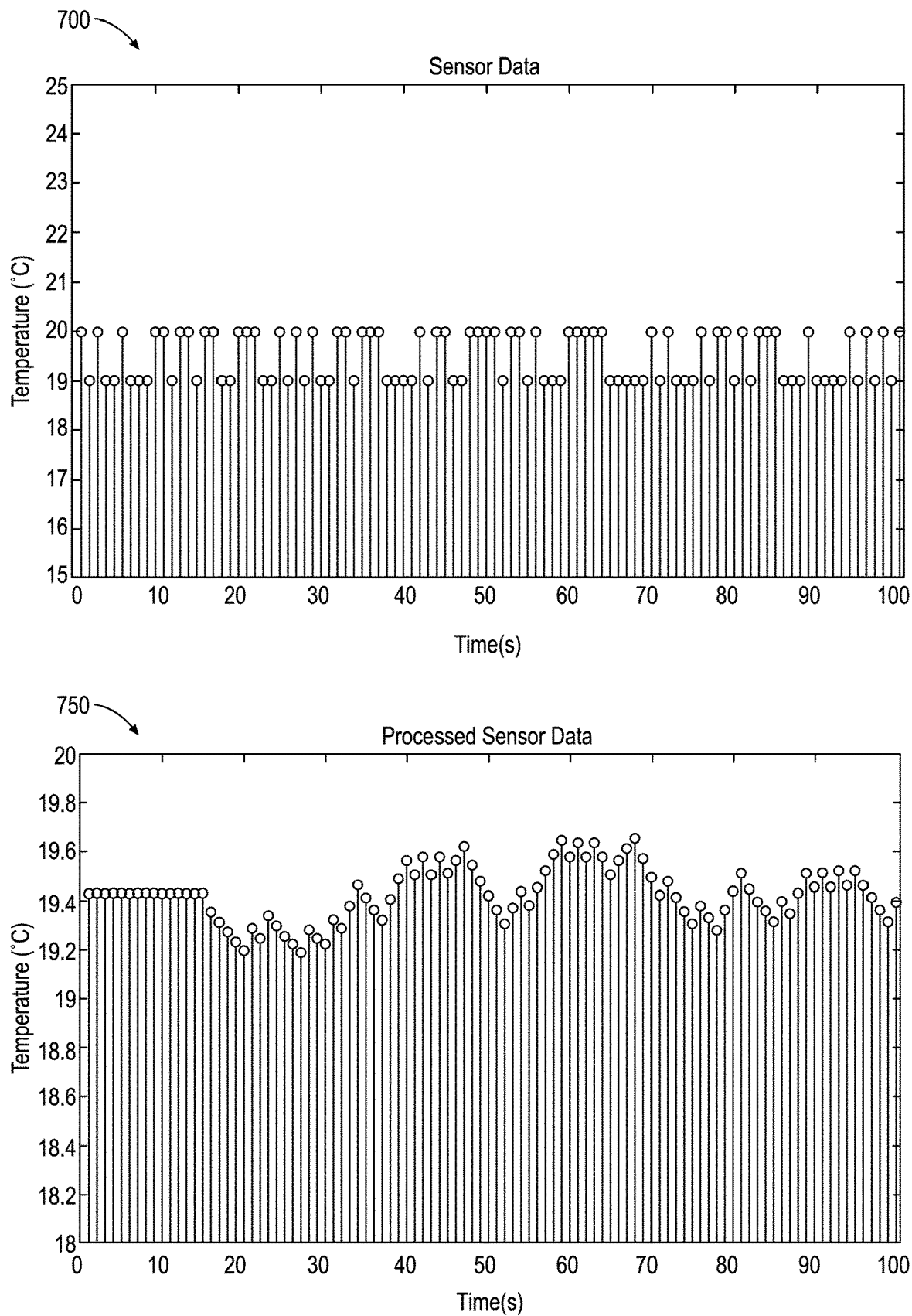
FIG. 7 is a drawing of two graphs showing sensor data with and without pre-processing by the controller of FIG. 5, according to some embodiments.

Referring now to FIG. 7, two graphs showing sensor data with and without pre-processing by controller 500 are shown, according to some embodiments. Graph 700 shows an example of imprecise and/or inaccurate temperature data indicative of temperature within a building that may be received by controller 500 from a physical temperature sensor. The temperature data shown in graph 700 represents a time series of temperature data where the time series includes a new temperature data point every second. As shown in graph 700, this sensor data only has a resolution of 1° C., and therefore only provides integer values that oscillate between 19° C. and 20° C. However, in reality, the actual temperature within the building varies between 19° C. and 20° C. For example, the actual temperature within the building may be 19.4° C., but the physical sensor may round this down to 19° C. Similarly, the actual temperature may be 19.7° C., but the sensor may round this up to 20° C. As such, if the data shown in graph 700 is provided as input to control application 532, controller 500 may make inaccurate control decisions. This phenomenon can lead to discomfort of building occupants as well as energy waste and increased cost.

In contrast, graph 750 shows an example of pre-processed sensor data that may be generated by controller 500 and provided as input to control application 532. For example, the data shown in graph 750 may correspond to an output of virtual sensor 530. As shown in graph 750, time window applicator 524 applies a time window of 15 seconds to the raw sensor data, and timing weight applicator 526 applies equations (1) and (2) above to generate corrected temperature data points that are then mapped to an output of a virtual sensor and provided as input to control application 532. The corrected temperature data points shown in graph 750 are not simply integer values like the data shown in graph 700. Instead, the corrected temperature data points have a higher resolution and vary between 19° C. and 20° C. based on the pre-processing performed by controller 500. As such, more accurate input data can be provided to control application 532, comfort of building occupants can be improved, energy can be saved, and cost can be reduced.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A method for controlling a variable refrigerant flow (VRF) system, the method comprising:
    applying a time window to sensor data associated with the VRF system, the sensor data comprising input data points having a first resolution, wherein applying the time window to the sensor data isolates a subset of the input data points;
    applying a timing weight to one or more input data points in the subset of the input data points to generate corrected data points having a second resolution higher than the first resolution;
    creating a virtual sensor and mapping the corrected data points to an output of the virtual sensor; and
    controlling the VRF system based on the output of the virtual sensor.

2. The method of claim 1, wherein the subset of the input data points comprises a set of most recent input data points.

3. The method of claim 1, wherein applying the timing weight to the one or more input data points in the subset of the input data points comprises applying a different timing weight to each input data point in the subset of the input data points.

4. The method of claim 1, further comprising:
    applying a highest timing weight to a most recent input data point in the subset of the input data points; and
    applying successively lower timing weights to a remainder of input data points in the subset of the input data points.

5. The method of claim 1, wherein the timing weight is proportional to a number of input data points in the subset of the input data points.

6. The method of claim 1, further comprising receiving the sensor data from a return air temperature sensor of the VRF system.

7. The method of claim 1, wherein controlling the VRF system based on the output of the virtual sensor comprises:
    applying the output of the virtual sensor as input to a control algorithm;
    determining a temperature setpoint using the control algorithm; and
    controlling the VRF system using the temperature setpoint.

8. A controller for use in a variable refrigerant flow (VRF) system, the controller comprising:
    one or more processors; and
    a memory comprising a control application that, when executed by the one or more processors, causes the controller to implement operations comprising:
        applying a time window to sensor data associated with the VRF system, the sensor data comprising input data points having a first resolution, wherein applying the time window to the sensor data isolates a subset of the input data points;
        applying a timing weight to one or more input data points in the subset of the input data points to generate corrected data points having a second resolution higher than the first resolution;
        creating a virtual sensor and mapping the corrected data points to an output of the virtual sensor; and
        controlling the VRF system based on the output of the virtual sensor.

9. The controller of claim 8, wherein the subset of the input data points comprises a set of most recent input data points.

10. The controller of claim 8, wherein applying the timing weight to the one or more input data points in the subset of the input data points comprises applying a different timing weight to each input data point in the subset of the input data points.

11. The controller of claim 8, the operations further comprising:
    applying a highest timing weight to a most recent input data point in the subset of the input data points; and
    applying successively lower timing weights to a remainder of input data points in the subset of the input data points.

12. The controller of claim 8, wherein the timing weight is proportional to a number of input data points in the subset of the input data points.

13. The controller of claim 8, the operations further comprising receiving the sensor data from a return air temperature sensor of the VRF system.

14. The controller of claim 8, wherein controlling the VRF system based on the output of the virtual sensor comprises:
    applying the output of the virtual sensor as input to a control algorithm;
    determining a temperature setpoint using the control algorithm; and
    controlling the VRF system using the temperature setpoint.

15. A variable refrigerant flow (VRF) system, the system comprising:
    an outdoor unit that conditions a refrigerant;
    one or more indoor units that receive the refrigerant and provide heating or cooling within a building;
    a controller comprising one or more processors and a memory, the memory comprising a control application that, when executed by the one or more processors, causes the controller to implement operations comprising:
        applying a time window to sensor data associated with the VRF system, the sensor data comprising input data points having a first resolution, wherein applying the time window to the sensor data isolates a subset of the input data points;
        applying a timing weight to one or more input data points in the subset of the input data points to generate corrected data points having a second resolution higher than the first resolution;
        creating a virtual sensor and mapping the corrected data points to an output of the virtual sensor; and
        controlling the VRF system based on the output of the virtual sensor.

16. The system of claim 15, wherein the subset of the input data points comprises a set of most recent input data points.

17. The system of claim 15, wherein applying the timing weight to the one or more input data points in the subset of the input data points comprises applying a different timing weight to each input data point in the subset of the input data points.

18. The system of claim 15, the operations further comprising:
    applying a highest timing weight to a most recent input data point in the subset of the input data points; and
    applying successively lower timing weights to a remainder of input data points in the subset of the input data points.

19. The system of claim 15, wherein the timing weight is proportional to a number of input data points in the subset of the input data points.

20. The system of claim 15, wherein controlling the VRF system based on the output of the virtual sensor comprises:
    applying the output of the virtual sensor as input to a control algorithm;
    determining a temperature setpoint using the control algorithm; and
    controlling the VRF system using the temperature setpoint.

* * * * *